United States Patent [19]

Parker, Jr.

[11] 4,272,863
[45] Jun. 16, 1981

[54] SHACKLING APPARATUS FOR LIVE POULTRY

[76] Inventor: Alonzo E. Parker, Jr., 1031 S. Plum St., Durham, N.C. 27701

[21] Appl. No.: 142,083

[22] Filed: Apr. 21, 1980

Related U.S. Application Data

[62] Division of Ser. No. 912,726, Jun. 5, 1978, Pat. No. 4,215,654.

[51] Int. Cl.³ .................... A22C 21/00; A22B 1/00
[52] U.S. Cl. .................................. 17/44.1; 119/97 R
[58] Field of Search ............. 17/44.1; 119/97 R, 151, 119/82

[56] References Cited

U.S. PATENT DOCUMENTS

| 721,829 | 3/1903 | Orr | 119/151 |
| 3,796,192 | 3/1974 | Parker, Jr. | 119/97 R |

FOREIGN PATENT DOCUMENTS 315174  2/1934  Italy ........................................ 119/151

*Primary Examiner*—Willie G. Abercrombie
*Attorney, Agent, or Firm*—B. B. Olive

[57] ABSTRACT

An apparatus for shackling and handling live poultry is based on gathering the live fowl on foot at the farm and conveying successive groups of the gathered fowl into shackles in which the live fowl are transported from the farm to the processing plant. At the processing plant, the shackles containing respective groups of fowl are adapted to be releasably supported on the processing conveyor for suspending the fowl during processing.

8 Claims, 15 Drawing Figures

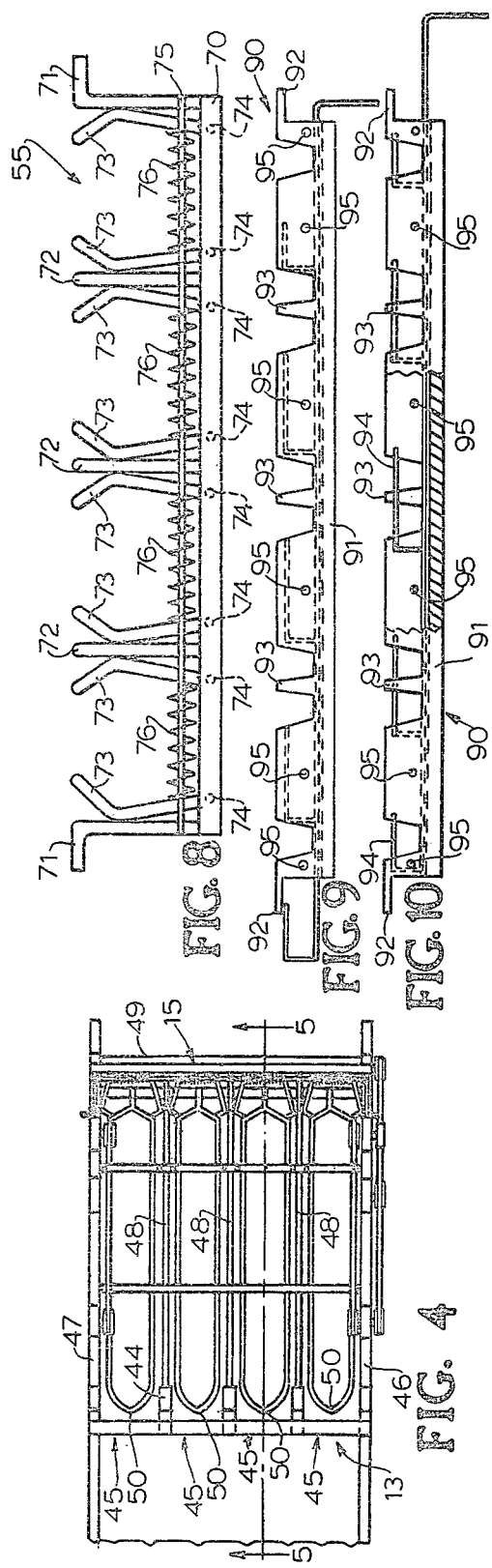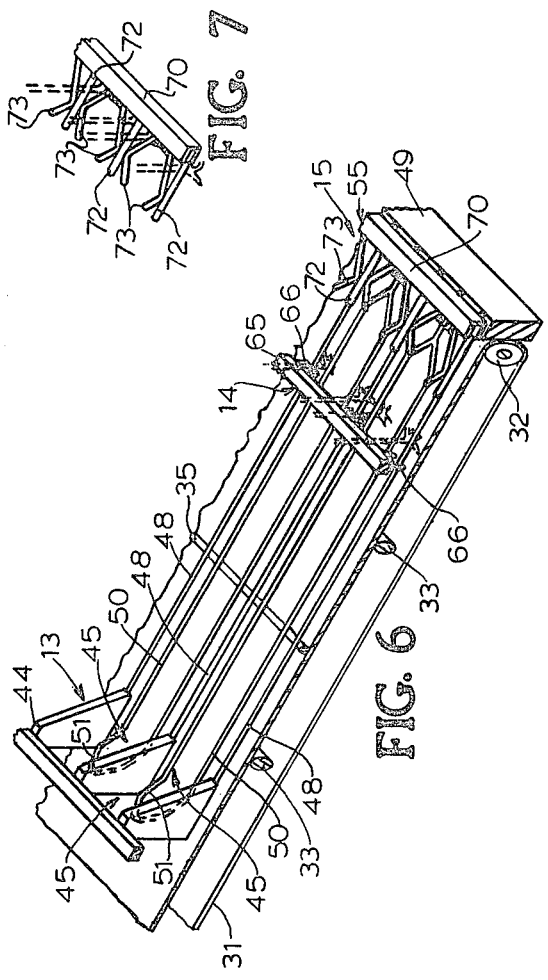

SHACKLING APPARATUS FOR LIVE POULTRY

CROSS-REFERENCE TO RELATED APPLICATIONS

This application is a division of copending application Ser. No. 912,726, filed June 5, 1978, entitled "Shackling System and Method For Live Poultry", now U.S. Pat. No. 4,215,654.

BACKGROUND OF THE INVENTION

1. Field of the Invention

The invention relates to shackling devices and apparatus for handling live poultry.

2. Description of the Prior Art

The traditional way of catching and cooping live poultry for transport to the processing plant is a dirty, undesirable, and labor consuming task. Catching crews must work during nighttime hours, physically catch the live poultry, load the poultry into coops, transfer the filled coops onto a transport vehicle, transport the poultry to the processing plant, remove the coops at the poultry processing plant and finally transfer the live poultry onto shackles and to a processing conveyor for delivery into the processing plant.

Prior to applicant's U.S. Pat. No. 3,796,192, no attempt had been made to deliver already shackled live poultry to the processing plant. While this patent teaches a shackle adapted to manual gathering and shackling at the farm and use of the shackle to suspend the poultry on the processing line, it does not teach a mechanical system and method for gathering and conveying the poultry on foot into the shackle. To date, as far as applicant is aware, no attempt has been made to provide a system for mechanical gathering and shackling of live poultry on foot at the farm and for delivering mechanically gathered and shackled poultry to a processing plant.

U.S. Pat. No. 401,812 teaches the concept of securing chickens individually in a coop during transit. With this exception, there was no known coop device which restrained the poultry within the coop during transit prior to applicant's issued U.S. Pat. No. 3,796,192. Furthermore, prior to applicant's U.S. Pat. No. 3,796,192, there was no known system for handling poultry based on manually gathering and shackling a group of live poultry in a shackle at the farm, transporting the poultry in the shackle to the processing plant and suspending the poultry in the shackle at the plant.

U.S. Pat. No. 1,222,072 is mentioned merely as being illustrative of an early poultry rack employed for processing.

U.S. Pat. No. 3,683,862 is a poultry system which employs suction for loading a transport vehicle at the farm for delivery to the processing plant.

U.S. Pat. Nos. 3,103,915; 3,110,388; 3,672,335; 3,722,477; 3,785,349 and 3,805,744 are illustrative of various conveying systems for catching and loading poultry.

U.S. Pat. Nos. 1,742,569; 2,448,421 and 2,594,824 illustrate various shackle constructions for use on poultry processing conveyor lines.

While the above devices and methods are illustrative of the types of systems and shackles available for catching, shackling and handling live poultry, to applicant's knowledge, no one has ever developed a system utilizing mechanical means for grouping and shackling live poultry on foot and in shackles adapted for use during processing.

SUMMARY OF THE INVENTION

The invention apparatus consists of a shackle guide mechanism and cooperative shackles. The poultry are directed to a conveyor which directs the fowl on foot into and moves the live fowl on foot along the shackle guide mechanism. As the fowl exit the guide mechanism, their limbs are directed into and releasably trapped in a releasably stationed shackle. The shackle holds a plurality of fowl and is adapted to be used both during transport from the farm to the processing plant and at the plant is adapted for releasable support on the processing conveyor for suspending the fowl during processing.

At the shackling station, in one form of apparatus, the shackle is releasably stationed and the fowl are conveyed on foot into the shackle while the shackle is stationary. In another form of apparatus, the shackles are effectively moved into engagement with the limbs of the fowl so that shackling is effected while the shackle is in motion. A variety of shackle constructions suited to the invention are illustrated.

DESCRIPTION OF THE DRAWINGS

FIG. 4 is a top plan view of the gating, guiding and shackling portion of the preferred embodiment of the present invention system.

FIG. 5 is a section view taken substantially along line 5—5 of FIG. 4.

FIG. 6 is an enlarged, fragmentary, perspective view of a portion of the gating, guiding and shackling portion of the preferred embodiment of the present invention.

FIG. 7 is a fragmentary, perspective view of a portion of the shackle with the legs of poultry shown in dashed lines.

FIG. 8 is a top plan view of the preferred embodiment of the shackle employed by the preferred embodiment of the present invention.

FIG. 9 is a top plan view of an alternative form of shackle capable of being employed with the mechanism of the preferred embodiment of the present invention, the shackle being shown in an open or receiving position.

FIG. 10 is a top plan view of the shackle of FIG. 9 with the shackle in a closed or poultry holding position.

DESCRIPTION OF THE PREFERRED EMBODIMENT

Figure 1:
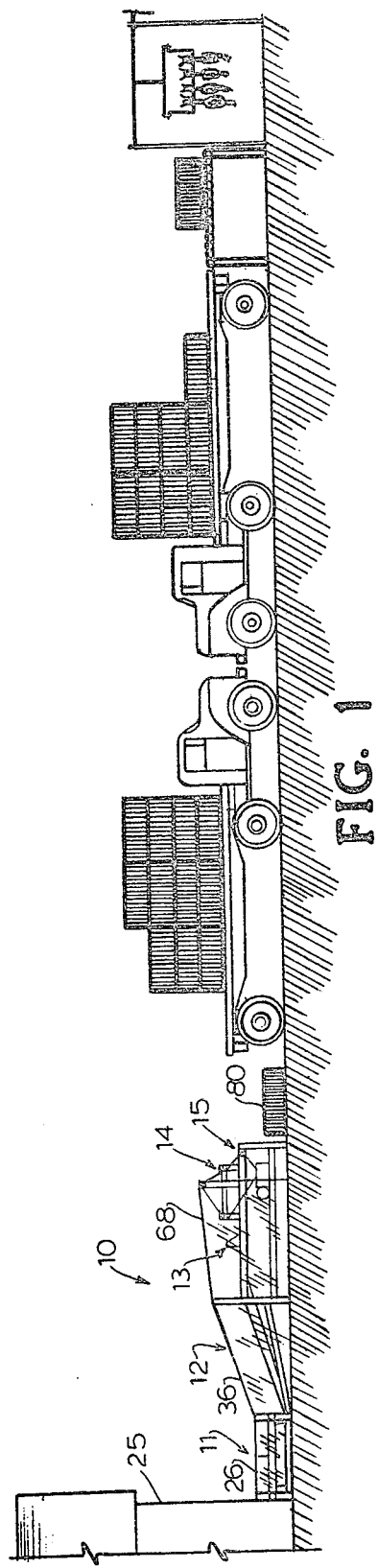
FIG. 1 is a side elevation view of the overall farm-to-plant system of the invention when coops containing shackled live poultry are employed.
Figure 3:
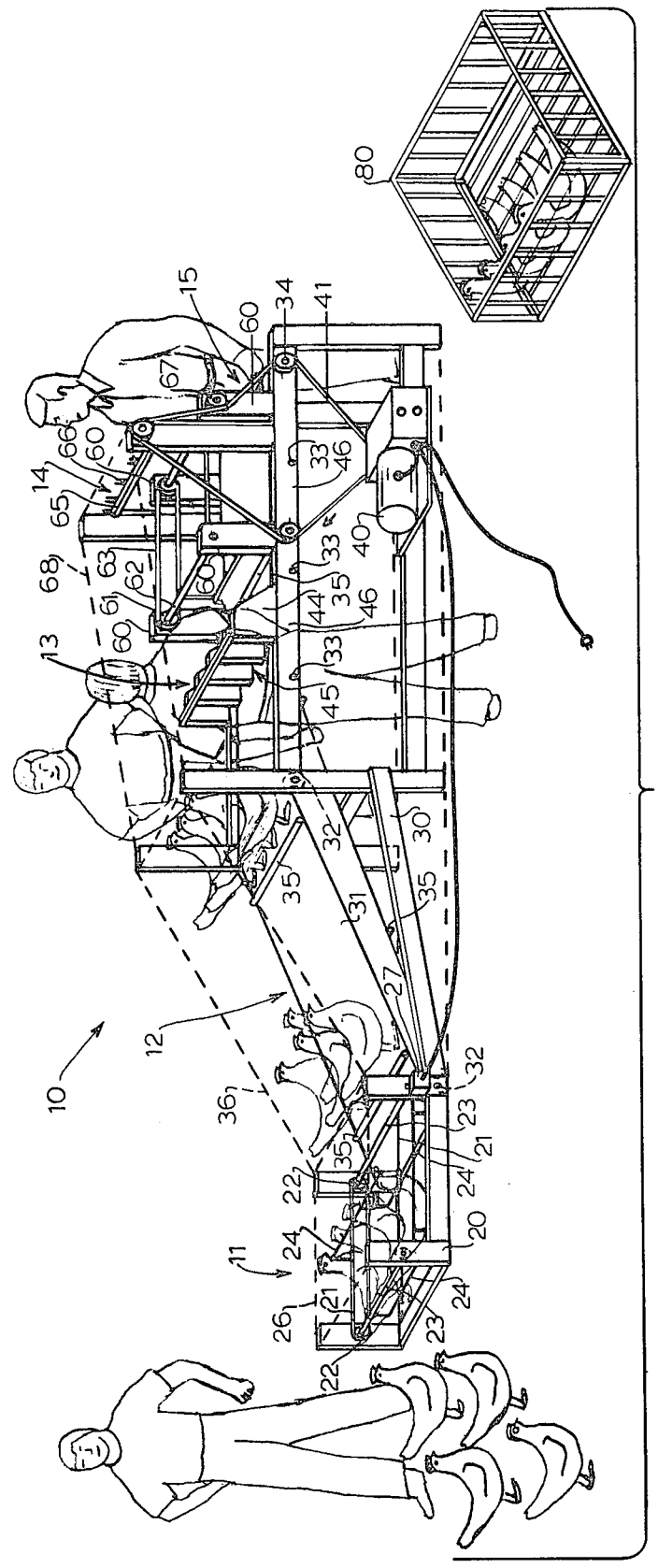
FIG. 3 is a perspective view of the mechanized system for gathering, conveying and shackling the live poultry on foot for delivery to the processing plant.
Figure 3A:
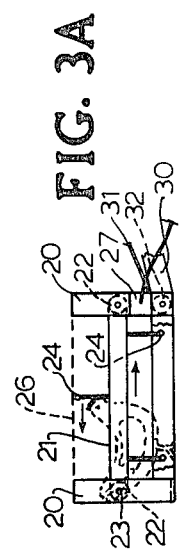
FIG. 3A is a fragmentary elevation view of the gathering apparatus.

Referring now to the drawings and particularly to FIGS. 1, 3 and 3A, the preferred embodiment of the mechanized system for gathering handling and shackling live poultry is generally designated 10. System 10 is intended to be stationed in an area having the live poultry on foot and is composed of gathering mechanism 11, conveying mechanism 12, gating mechanism 13, leg guide mechanism 14 and shackling mechanism 15. Mechanized system 10, although not so illustrated, is capable of being mounted on wheels and pulled as a trailer from farm to farm and of being constructed for folding into a compact unit for travel.

Gathering mechanism 11 is composed of frame 20, chains 21, drive sprockets 22, axles 23 and pusher bars 24. Gathering mechanism 11, as seen in FIG. 1, is positioned directly in front of the poultry house 25 and is located to provide an escape free gathering mechanism once an appropriate side and top covering 26 is provided therefor. The live poultry are manually directed on foot from within housing 25 into gathering mechanism 11 so that slow moving pusher bars 24 gently contact the rear of the poultry, separate them into groups, and move them along a forwardly directed path. Pusher bars 24 are mounted on chains 21 and chains 21 are driven in a counterclockwise direction, as viewed in FIGS. 3 and 3A, by sprockets 22 which are driven by motor 27 through axles 23. Motor 27 is of variable speed and its speed is synchronized with the remaining mechanism to be later discussed. While not shown, the entire mechanism 10 could be stationed within the poultry house and the poultry driven into gathering mechanism 11 or the entire mechanism 10 could be on wheels and rolled into the poultry house and the poultry gently directed into the gathering mechanism 11.

Gathering mechanism 11 groups the live poultry and directs them to elevating conveying mechanism 12. Conveying mechanism 12 is composed of frame 30, endless conveyor belt 31, idler rollers 32, guide bars 33, drive pulley 34 and transverse spacing bars 35. Endless conveyor belt 31 is driven in a clockwise direction, as viewed in FIG. 3, so that as the poultry are grouped and directed by pusher bars 24 they are gently forced onto belt 31 and are moved upward and forward to a predetermined elevated level at which conveyor belt 31 travels in a plane generally parallel to the ground surface. Endless conveyor 31 passes beneath gating mechanism 13 and shackling mechanism 15 and provides a continuous moving support and path for the live poultry to follow. The previously-mentioned side and top covering 36 serves to maintain the poultry within the confines of the conveying mechanism 12. Endless conveyor belt 31 is driven by motor 40 which through belt 41 drives pulley 34.

As previously mentioned, conveyor belt 31 passes beneath and clears gating mechanism 13. Gating mechanism 13 is composed of a structure which mounts on sideboards 46, 47, straddles coveyor belt 31 and establishes four separate gates or stalls 45 through which individual fowl can pass. As best seen in FIG. 3, members of the catching crew direct the live poultry on foot into the gathering mechanism 11, preferably in groups of fours to which the spacing between bars 24 accommodates, from which the poultry can then be mechanically directed and transported on conveyor belt 31 in groups of fours utilizing the conveyor spacer bars 35. As the elevated poultry enter gating mechanism 13, spacer bars 35 on belt 31 encourage the poultry to continue forward along the same path and a pair of catching crew members are stationed adjacent gating mechanism 13, one on each side thereof, to insure that each of the fowl is guided into an individual gate 45 defined by the upright barriers 44. Parallel gate rods 48 are fixed at one end to barriers 44 and at their other end to end board 49 so as to reside in a plane parallel with belt 31 and at a predetermined distance above belt 31 to allow free passage of spacer bars 35. Cooperating with and laterally spaced from gate rods 48 are another set of rods identified as leg positioner rod members 50 which are positioned centrally and forwardly of each of gates 45. Each rod member 50 is substantially U-shaped and has a main closed loop portion extending from within and forward of a respective gate 45 and forwardmost leg portions secured to end board 49. Rod members 50 are held in a plane parallel with that of gate rods 48. End portions 51 (FIG. 6) of rod members 50 angle upwardly.

As each individual live fowl is mechanically directed and conveyed into one of gates 45 on foot, the trailing U-shaped end portion of the corresponding poultry leg positioner rod member 50 positions the fowl's legs and causes them to be spread apart and with the feet of the fowl trapped below the plane of positioner rod members 48 and 50 during which the fowl continues to be moved forward on conveyor belt 31. Then, as the fowl moves forward, each confined limb portion is guided between adjacent portions of rods 48 and 50 or in the case of the outermost limb portions between portions of rod 50 and one of the sideboards 46 and 47 which also act as guides. It may be noted as the limb portions move along, the feet of the fowl remain trapped by means of rods 48 and 50 and until they are guided into and held by the temporarily stationed shackle 55. Using the outermost gate adjacent sideboard 46 for illustration, as a fowl enters this gate 45, it has its legs spread so that one leg is positioned between sideboard 46 and the adjacent portion of positioner rod member 50. The other leg of the fowl is positioned between the opposite portion of this somewhat U-shaped closed loop portion of positioner rod member 50 and the next adjacent gate rod 48. While the fowl is being positioned astraddle one of the positioner rod members 50 as described, the conveyor belt 31 continues to move forward and the appropriate spacer bar 35 encourages forward movement should the fowl attempt to back up.

At this point, the poultry are being positioned, guided, and conveyed on foot and are approaching the shackling mechanism 15. A poultry shackle 55, in the preferred embodiment, is held in position at a shackling station by a member of the catching crew as seen in FIGS. 3 and 6. Alternatively, suitable means such as a releasable catch, releasable clamp, or the like, may be provided to releasably secure shackle 55 at the shackling station. In either case shackle 55 is appropriately positioned and its securing means oriented to receive and releasably secure the limbs of the poultry as they are guided into the shackle.

In order to insure that the poultry continue to move toward shackle 55, a leg guide mechanism 14 is employed which contacts the rear of the fowl's legs and urges them forward into shackle 55 as illustrated by FIGS. 5 and 6. Leg guide mechanism 14 has frame or upright members 60, pulleys 61, axles 62, drive belts 63, guide supports 64, guide bars 65, leg guide fingers 66 and drive pulley 67 which is driven by motor 40 through belt 41. Leg guide mechanism 14 and shackling mechanism 15 are enclosed by an appropriate top and side cover 68.

As viewed in FIG. 5, leg guide mechanism 14 is driven in a counter-clockwise direction so that guide fingers 66 are positioned directly behind the legs of the poultry and so that each guide bar 65 moves along just above gate rods 48 and leg positioner members 50. The legs of the individual fowl are in effect forced forward by conveyor belt 31 and guide bar 65 until the legs of the poultry are forced into shackle 55 by guide fingers 66.

FIGS. 5, 6, 7 and 8 most clearly illustrate the structure of shackle 55 of the preferred embodiment and is adapted to be held in position at the shackling station by one of the catching crew as seen in FIG 3. As previously mentioned, a suitable catch, releasable clamp or other means, could be employed to releasably secure the shackle properly oriented and temporarily fixed in position during the shackling operation. In the embodiment being described, shackle 55 consists of a channel bar 70, integral fixed hanging members 71, integral fixed guiding and alignment rods 72, pivotal leg engaging members 73, pivot pins 74, integral rod 75 and spring members 76. When in use at the shackling station, the hanging members 71 rest on sideboards 46, 47; bar 70 rests on end board 49 and shackle 55 is generally oriented for receiving live poultry therein. Alignment bars 72 are integrally secured to bar 70 and during shackling are oriented to extend outwardly in the direction from which the poultry are received and are adapted to be positioned so as to be aligned with gate rods 48. Pivotal leg engaging members 73 are also oriented during shackling to extend outwardly in the direction from which the poultry are received and, thus, are placed in position for receiving limb portions of the poultry as they are forced forward by the respective guide bars 65 and leg guide fingers 66.

As the poultry legs enter shackle 55, engaging members 73 pivot open, the legs enter and members 73 pivot closed due to the force of springs 76 pushing against members 73. FIG. 7 illustrates the position of the feet and secured legs of the loaded poultry within shackle 55. As the legs of one group of poultry are pushed into a shackle 55, the leg guide mechanism 14 continues to rotate and a succeeding guide bar engages a succeeding group of poultry and begins to urge such poultry forward. While these new poultry are being moved into shackling position at the shackling station, a member of the catching crew removes the loaded shackle 55 and places it in an open top coop 80 located adjacent the shackling area. Coop 80 receives the loaded shackle 55 and is designed to receive a predetermined number of such loaded shackles. Coop 80 is preferably equipped with integral breast support bars, not shown, to aid in reduction of bruising of the poultry during transport. No top is needed on the coop as the poultry are maintained within shackles 55 and can be upright in transit as shown.

FIGS. 9 and 10 illustrate an alternative form of poultry shackle 90. Shackle 90 consists of body portion 91, integral hanging members 92, integral alignment tabs 93, sliding leg engaging wire 94 and wire guide pins 95. Members 92 in use rest on sideboards 46, 47 and alignment tabs 93 align with gate rods 48. FIG. 9 illustrates shackle 90 in an open position and FIG. 10 illustrates shackle 90 in a closed position designed to trap the limb portions of the poultry therein.

Having described a preferred embodiment of the apparatus, the description will now further explain the method of operation in reference to FIG. 1. In such preferred form of operation, the mechanized system for handling live poultry is utilized at the farm. Prior to use, the gathering mechanism is positioned at a fixed location in the doorway of the poultry house or when appropriate within the poultry house itself. A member of the catching crew is stationed within the house and directs the live poultry into the gathering mechanism. The poultry are directed and moved forward by gathering mechanism 11 and are then conveyed upwardly from floor level by conveying mechanism 12 to a higher level. As previously mentioned, the poultry in the embodiment illustrated are preferably mechanically gathered, moved, guided and shackled in groups of four. Each such group of poultry is moved and guided through the gating mechanism and into the area of the leg guide mechanism. At this point, the paired legs of the poultry are entrapped in a shackle, either shackle 55 or 90, in a side-by-side array. The loaded shackle is placed within a coop and once the coop is filled, the coop is transferred to a transport vehicle for delivery to the processing plant. Once at the processing plant, each coop is removed and each loaded shackle with its group of fowl is removed from the coop. Each loaded shackle is then mounted directly on a conveyor from which the poultry are suspended on the shackle during processing. Once the poultry are processed and the limb portions removed, the shackles are returned to the coop and are ready for reuse.

Figure 2:
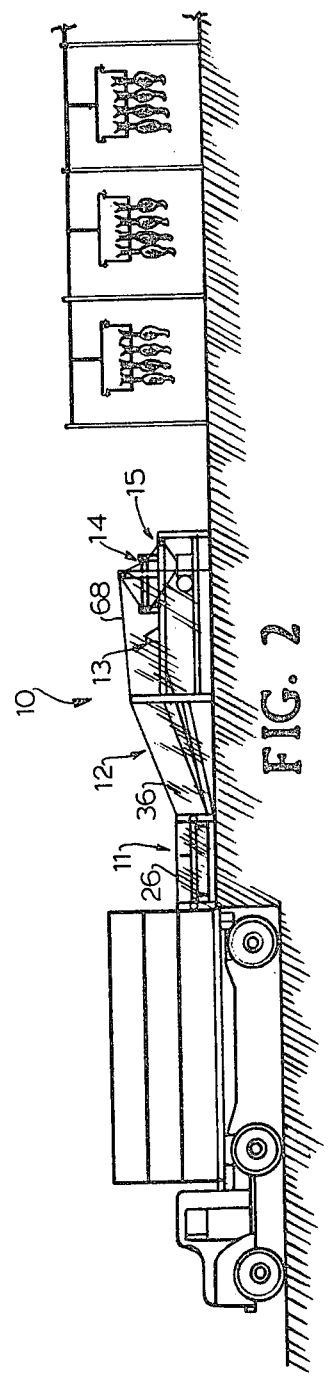
FIG. 2 is a side elevation view, similar to FIG. 1, of the overall farm-to-plant system of the invention when the live poultry are loaded directly into compartments and transported uncooped, loose and on foot in the transport vehicle.

FIG. 2 illustrates how the preferred embodiment of the invention system is used with transport vehicles which receive and transport poultry loose, on foot and uncooped. The transport vehicle of FIG. 2 may, for example, have its load receiving area divided into three layers with each layer capable of receiving poultry on foot, loose, and uncooped for delivery to the processing plant. In this type of operation, the mechanized system of the invention for handling the live poultry is located at the loading dock of the processing plant as illustrated. Once the filled transport vehicle reaches the processing plant, gathering mechanism 11 is moved into position and the poultry are directed into the gathering mechanism. The gathering mechanism groups and moves the poultry forward to be conveyed upwardly on the conveying mechanism. Alternatively, the vehicle unloading platform and the conveying mechanism can be arranged at levels allowing the poultry to be conveyed on an essentially horizontal plane to the gating mechanism. In either case, successive groups of the gathered fowl are directed into the gating mechanism and with the aid of the leg guide mechanism are directed into appropriate shackles, either shackle 55 or 90, successively placed at the shackling station. Once the poultry are shackled, the loaded shackles are hung directly on the conveying mechanism for delivery into the processing area. Once the poultry are processed and the shackles unloaded, the shackles are returned to the shackling area for reuse.

Figure 11:
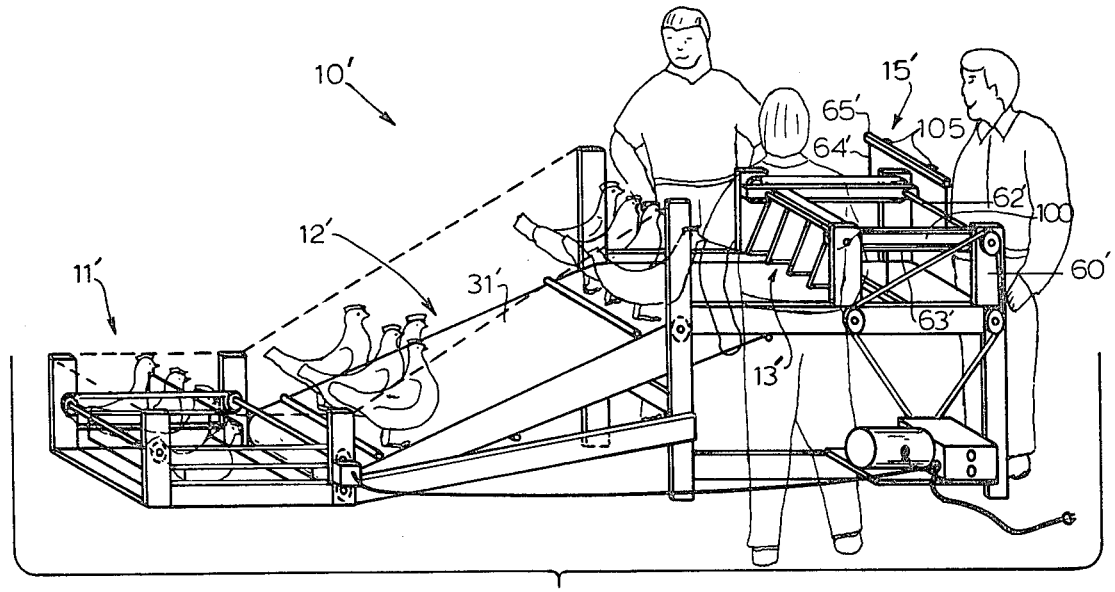
FIG. 11 is a perspective view of an alternative embodiment of the mechanized system for gathering, conveying and shackling live poultry.
Figure 12:
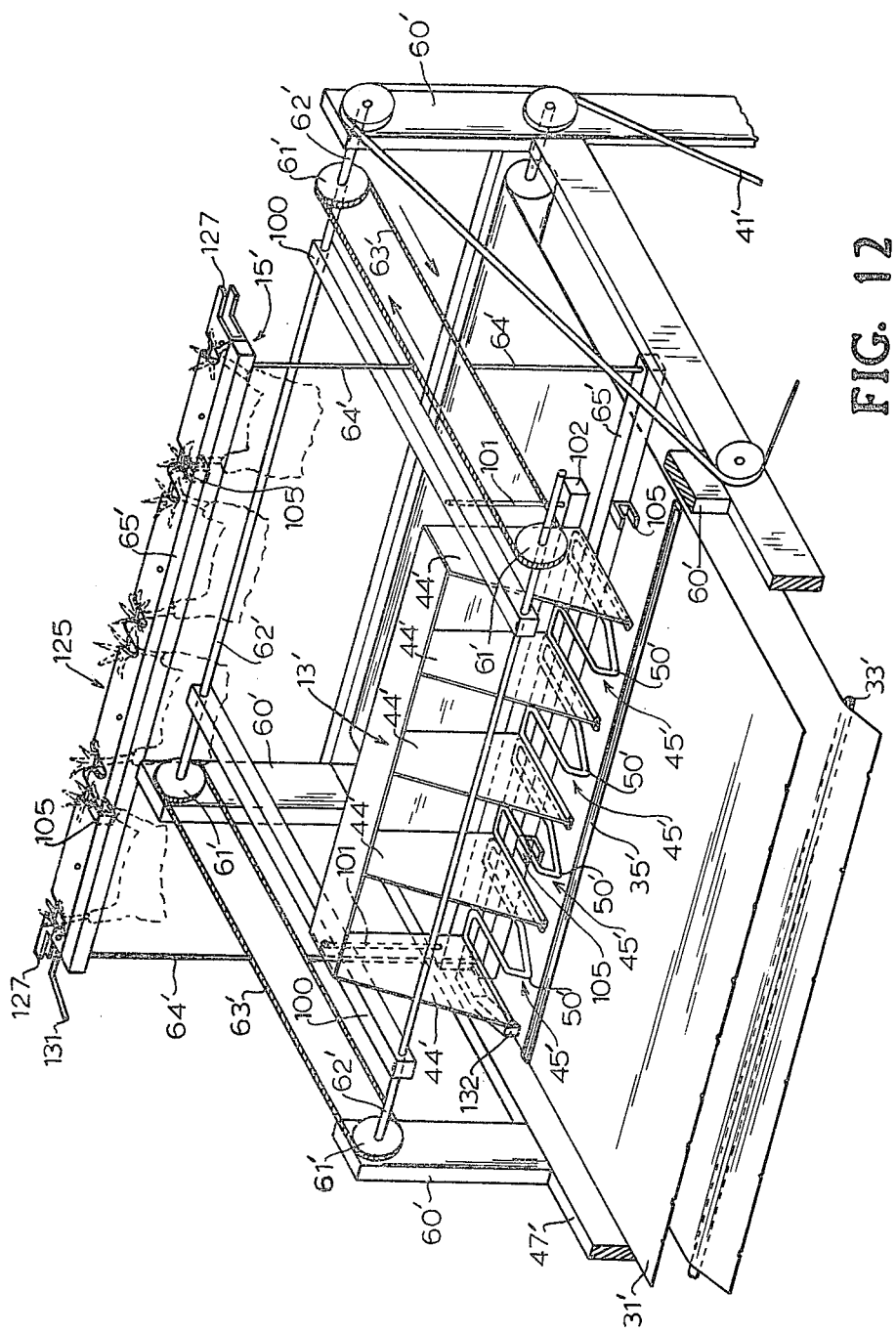
FIG. 12 is an enlarged, fragmentary, more detailed, perspective view of the gating and shackling mechanism of the alternative embodiment mechanism with portions thereof broken away for illustrative purposes and with one loaded shackle illustrated.

An alternative mechanized system for gathering, handling and shackling live poultry according to the invention is illustrated in FIGS. 11 and 12 and is generally designated 10'.

System 10' is somewhat similar to system 10 of the preferred embodiment in that it has an identical gathering mechanism 11' and conveying mechanism 12'. Gating mechanism 13' is similar to gating mechanism 13 but differs in some ways to be discussed later in the description. Upright frame members 60' mount sprockets 61' and axles 62'. Axles 62' are rotatably mounted in members 60' and sprockets 61' are fixedly mounted on axles 62'. Drive chains 63' are received by mating sprockets 61' and drive sprockets 61' in a synchronized manner. A pair of support bars 100 are mounted on axles 62' with appropriate bearings and arranged in a manner that allows axles 62' to rotate therein but maintain bars 100 in a fixed position widthwise. A pair of hanger rods 101 are suspended in a fixed position from bars 100 and mount in a fixed manner a gate bar 102. Gate bar 102 mounts in a fixed manner gating mechanism 13' of the alternative system (see FIG. 12). Gating mechanism 13' straddles and clears conveyor belt 31' which in this embodiment is somewhat shorter in length than is previously-mentioned belt 31. Gating mechanism 13' divides the area above belt 31' into four separate gates or stalls 45'.

As best seen in FIG. 11, members of the catching crew, with the aid of conveyor belt 31', direct the live poultry on foot into the gating mechanism 13'. Each individual gate 45' is defined by upright barriers 44'. Leg positioner rod members 50' are integrally secured to and positioned between barriers 44' of each of gates 45'. Each rod member 50' is substantially W-shaped and has a main closed central portion located within and extending in alignment with each respective gate 45' with the outermost leg portions secured to the base of each upright barrier 44'.

As each individual fowl is directed and conveyed into one of gates 45' on foot, the corresponding poultry leg positioner rod member 50' positions the fowl's legs and causes them to be spread apart and with the feet of the fowl trapped below the plane of the respective positioner rod member 50'. While the fowl is being positioned astraddle the respective positioner rod member 50', the conveyor belt 31' continues to move forward and the appropriate spacer bar 35' encourages forward movement should the fowl attempt to back up. As can be readily seen, each fowl travels only a relatively short distance once it enters the respective leg positioner rod member 50' and respective gate 45'.

Figure 13:
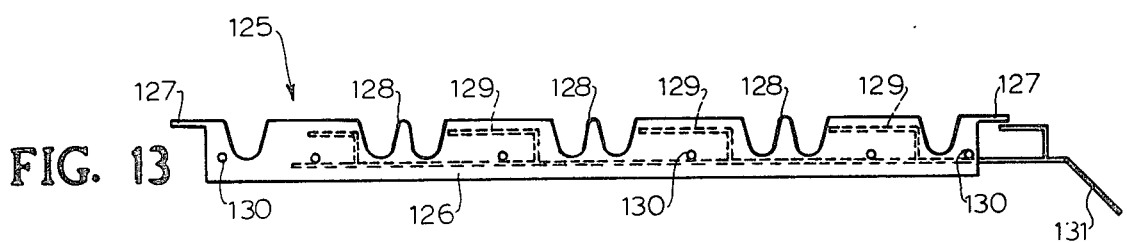
FIG. 13 is a top plan view of an alternative embodiment shackle employed in the alternative embodiment system with the shackle in an open position.
Figure 14:
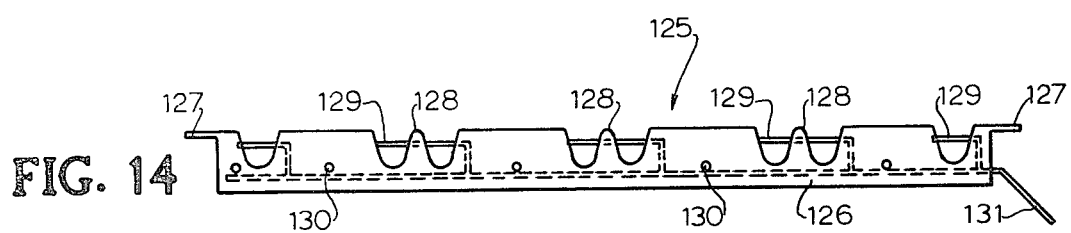
FIG. 14 is a top plan view of the shackle of FIG. 13 with the shackle in a closed, poultry retaining position.

At this point of travel, the poultry are ready for shackling by shackling mechanism 15'. In this embodiment, the shackling of poultry takes place while the poultry are within the respective gates 45'. Supports 64' and bars 65' are integrally secured on drive chains 63' as in the preferred embodiment. However, drive chains 63' are driven in a clockwise direction as viewed in FIG. 12 rather than in a counter-clockwise direction as in the first embodiment. This is accomplished by appropriate positioning of belt 41' which is driven by motor 40'. Bars 65' have shackle receiving brackets 105 which are adapted to hold and releasably and tightly clamp a shackle 125 such as illustrated in FIGS. 13-14. Shackle 125 is placed in brackets 105 and is securely held in place by the clamping action of brackets 105 and so that as each shackle 125 approaches gates 45' the poultry receiving end of the shackle 125 is facing the poultry.

Shackle 125, mounted on bar 65', moves forward toward gates 45' in a plane parallel with but slightly above conveyor belt 31' and beneath leg positioner members 50'. Shackle 125 approaches gates 45' and in an open position and as the poultry legs are positioned in shackle 125, means is provided for automatically closing the appropriate shackle members about the legs of the poultry.

Shackle 125 and its closing means are illustrated in FIGS. 13-14. Shackle 125 is very similar in construction to shackle 90 illustrated in FIGS. 9-10. However, unlike shackle 90 which was illustrated as being adapted for being closed about the poultry's legs by manually pulling a hand rod to close leg engaging wires 94 around the legs of the poultry, shackle 125 is designed to be automatically closed about the legs of the poultry. Shackle 125 consists of a multiple recessed body portion 126, integral conveyor hanging members 127, integral alignment tabs 128, sliding leg engaging wires 129, appropriate wire guide pins 130, and a shackle activating rod portion 131.

In operation, shackle 125 is held securely but releasably clamped in brackets 105 on bar 65' with shackle 125 prepared to receive the poultry in an open position, i.e., with leg engaging wires retracted as seen in FIG. 13, and with shackle activating rod 131 in an outward extending position as also seen in FIG. 13. Shackle closing arm 132 extends outward from the frame sideboard 47' and, as shackle 125 moves toward the poultry, arm 132 engages the angled shackle activating rod 131. Then, as shackle 125 continues to move forward, arm 132 forces rod 131 inward and in turn closes leg engaging wires 129 about the legs of the poultry. At the point where the legs of the poultry are in position in shackle 125, arm 132 begins its closing action on rod 131. By the time shackle 125 reaches the end of gates 45', shackle 125 is closed and the poultry are trapped. At this time, the poultry in shackle 125 are raised from belt 31' and lifted as chains 63' rotate clockwise on sprockets 61'. Once the poultry are held aloft, shackle 125 moves rearward to a point where an operator removes the loaded shackle 125 and places it in a coop as in the preferred embodiment of FIG. 1 for delivery to the processing plant or an operator may place the loaded shackle 125 directly on the processing conveyor for delivery into the processing area as in FIG. 2. In either application, an unloaded, open shackle 125 is installed in brackets 105 to replace the removed loaded shackle 125 and the cycle repeats itself. FIG. 12 illustrates one bar 65' passing below the gates 45' but without a shackle to simplify the drawing. Another bar 65' is shown above the gates 45' holding four of the loaded fowl, shown in dotted lines, in a shackle.

While not illustrated, the invention contemplates that poultry after being shackled at the farm with the shackling apparatus of the invention as seen in FIG. 3 or FIG. 11 could be loaded directly into trucks adapted to receive the loaded shackles and thereby eliminate use of coops as in FIG. 1. For example, the type of truck shown in FIG. 2 which ordinarily transports poultry loose could be fitted with rails, or the like, spaced apart and on different levels to receive the poultry in their shackles. In this embodiment, the shackled poultry would be unloaded directly from the rails and onto the processing conveyor at the plant.

What is claimed is:

1. Shackling apparatus adapted for shackling and handling live poultry on foot comprising, in combination:
   (a) an elongate base frame structure adapted to be supported in the path of and loaded with a plurality of live fowl on foot and when loaded with a plurality of said fowl adapted to be releasably supported on a processing conveyor; and
   (b) laterally-spaced releasable limb securing means mounted on and extending outwardly from said base frame structure for receiving plural pairs of fowl limbs and having movable limb-holding portions adapted to open to receive and to thereafter close and releasably secure selected plural laterally-spaced paired limb portions of the fowl while on foot and in a side-by-side array adjacent said base frame structure.

2. Shackling apparatus as claimed in claim 1 wherein said movable portions include releasable locking means adapted in one position to place said limb-securing means in said open position and in said open position provide an unobstructed path for entry of said fowl limbs to a position proximate said base frame structure and in another position adapted to close and lock said limb-securing means in said closed position.

3. Shackling apparatus as claimed in claim 1 wherein said laterally-spaced releasable securing means including laterally-spaced members fixed to and extending outwardly from said base frame structure and said movable limb holding portions comprise other operatively associated members pivotal with respect to said fixed members to said open position and including resilient means tending to maintain said pivotal members in said closed position.

4. Shackling apparatus as claimed in claim 1 including conveyor means for moving said poultry and said shackle structure relative to each other wherein said poultry limbs are caused to enter said structure.

5. Shackling apparatus for shackling live poultry on foot comprising, in combination:
   (a) a shackle structure, comprising:
      (i) an elongate base frame structure adapted to be supported in the path of and loaded with a plurality of live fowl on foot and when loaded with a plurality of said fowl adapted to be releasably supported on a processing conveyor; and
      (ii) laterally-spaced releasable limb-securing means mounted on and extending outwardly from said base frame structure for receiving plural pairs of fowl limbs and having movable limb holding portions adapted to open to receive and to thereafter close and releasably secure selected laterally-spaced paired limb portions of the fowl while on foot and in a side-by-side array adjacent said base frame structure;
   (b) means for supporting said shackle structure in the path of live fowl moving on foot at a shackling station; and
   (c) means for mechanically actuating said movable limb holding portions when in said open position to move to said closed position and operative in timed relation with loading of said shackle structure.

6. Shackling apparatus as claimed in claim 5 including associated conveyor means adapted to support and bring successive said shackle structures to said shackle station in appropriate orientation and position for loading said live poultry on foot and after loading adapted to convey said loaded and closed shackle structure away from said shackling station with the loaded fowl suspended therefrom.

7. A shackling apparatus as claimed in claim 5 including means for conveying and guiding said fowl on foot into said shackle structure.

8. A shackling apparatus as claimed in claim 6 including means for conveying and guiding said fowl on foot into said shackle structure.

* * * * *